(12) United States Patent
Matsui et al.

(10) Patent No.: US 9,689,430 B2
(45) Date of Patent: Jun. 27, 2017

(54) GEAR TRANSMISSION

(71) Applicant: NABTESCO CORPORATION, Tokyo (JP)

(72) Inventors: Daisuke Matsui, Tsu (JP); Yusuke Kataoka, Tsu (JP)

(73) Assignee: NABTESCO CORPORATION, Tokyo (JP)

( * ) Notice: Subject to any disclaimer, the term of this patent is extended or adjusted under 35 U.S.C. 154(b) by 0 days.

(21) Appl. No.: 14/778,944

(22) PCT Filed: Mar. 6, 2014

(86) PCT No.: PCT/JP2014/055749
§ 371 (c)(1),
(2) Date: Sep. 21, 2015

(87) PCT Pub. No.: WO2014/156535
PCT Pub. Date: Oct. 2, 2014

(65) Prior Publication Data
US 2016/0047418 A1 Feb. 18, 2016

(30) Foreign Application Priority Data
Mar. 25, 2013 (JP) ................................ 2013-062082

(51) Int. Cl.
*F16C 33/46* (2006.01)
*F16C 19/36* (2006.01)
(Continued)

(52) U.S. Cl.
CPC ........ *F16C 33/6681* (2013.01); *F16C 19/364* (2013.01); *F16C 33/4605* (2013.01);
(Continued)

(58) Field of Classification Search
CPC .. F16C 19/364; F16C 19/548; F16C 2361/61; F16C 33/46; F16C 33/4605;
(Continued)

(56) References Cited

U.S. PATENT DOCUMENTS 4,136,916 A * 1/1979 Musselman ........... F16C 19/225
29/898.041
4,523,862 A * 6/1985 Yasui .................... F16C 19/364
384/564
(Continued)

FOREIGN PATENT DOCUMENTS

JP S55-10140 A 1/1980
JP 2001-349329 A 12/2001
(Continued)

OTHER PUBLICATIONS

English Translation of the International Preliminary Report on Patentability as issued in International Patent Application No. PCT/JP2014/055749, dated Oct. 8, 2015.
(Continued)

*Primary Examiner* — Marcus Charles
(74) *Attorney, Agent, or Firm* — Pillsbury Winthrop Shaw Pittman LLP (57) ABSTRACT

A carrier is supported by a case via a bearing. The bearing comprises an inner race, an outer race, rollers, and a retainer. The inner race has a tapered outer peripheral surface, and is fixed to a carrier. The outer race has a tapered inner peripheral surface facing the outer peripheral surface of the inner race, and is fixed to the case. The rollers is disposed between the inner race and the outer race. An end part of the retainer having a larger diameter makes contact with the case via a first member. The larger diameter end part of the retainer makes contact with the case via a second member. By the retainer making contact with the case and the carrier via the first member and the second member, the retainer can
(Continued)

reduce friction compared to when making direct contact with the case and the carrier.

15 Claims, 8 Drawing Sheets (51) Int. Cl.
F16C 33/66 (2006.01)
F16H 1/32 (2006.01)
F16C 19/54 (2006.01)

(52) U.S. Cl.
CPC .............. *F16H 1/32* (2013.01); *F16C 19/548* (2013.01); *F16C 33/46* (2013.01); *F16C 2361/61* (2013.01); *F16H 2001/323* (2013.01)

(58) Field of Classification Search
CPC ...... F16C 33/6681; F16C 33/58; F16C 33/48; F16C 33/467; F16C 19/38; F16H 1/32; F16H 2001/323
USPC ........ 384/548, 560–561, 564–565, 571–572, 384/618, 621, 623
See application file for complete search history.

(56) References Cited

U.S. PATENT DOCUMENTS

| | | | | |
|---|---|---|---|---|
| 4,699,529 A | * | 10/1987 | Scholl | F16C 19/26 384/484 |
| 5,009,525 A | * | 4/1991 | Brockmuller | F16C 19/26 384/576 |
| 5,037,214 A | * | 8/1991 | Dougherty | B60B 27/001 384/561 |
| 6,386,764 B1 | * | 5/2002 | Moore | F16C 19/364 384/448 |
| 8,535,009 B2 | * | 9/2013 | Hofmann | F16C 19/386 290/44 |
| 2007/0133914 A1 | * | 6/2007 | Matsuyama | F16C 19/163 384/470 |
| 2010/0308594 A1 | | 12/2010 | Numajiri | |
| 2010/0322548 A1 | * | 12/2010 | Kanbori | B60B 35/18 384/571 |
| 2011/0000394 A1 | | 1/2011 | Miki et al. | |

FOREIGN PATENT DOCUMENTS

| | | | | |
|---|---|---|---|---|
| JP | 2005-147308 A | | 6/2005 | |
| JP | 2008249105 A | * | 10/2008 | .............. F16C 33/46 |
| JP | 2009-192045 A | | 8/2009 | |
| JP | 2010-159774 A | | 7/2010 | |
| JP | 2012072869 A | * | 4/2012 | .............. F16C 33/46 |
| KR | 20120065450 A | * | 6/2012 | .......... F16C 33/4635 |
| WO | WO 2010/007677 A1 | | 1/2010 | |

OTHER PUBLICATIONS

International Search Report as issued in International Patent Application No. PCT/JP2014/055749, dated Jun. 3, 2014.
Written Opinion of the International Searching Authority as issued in International Patent Application No. PCT/JP2014/055749, dated Jun. 3, 2014.
Notification of Reason for Rejection as issued in Japanese Patent Application No. 2013-062082, dated Sep. 6, 2016.

* cited by examiner

GEAR TRANSMISSION

CROSS-REFERENCE TO RELATED APPLICATIONS

This application is the U.S. National Stage of PCT/JP2014/055749, filed Mar. 6, 2014, which in turn claims priority to Japanese Patent Application No. JP 2013-062082, filed Mar. 25, 2013. The contents of these applications are incorporated herein by reference in their entireties.

TECHNICAL FIELD

The present specification discloses a technique relating to a gear transmission. In particular, the present specification discloses a technique relating to a gear transmission provided with a cylindrical roller bearing between a carrier and a case.

BACKGROUND ART

A gear transmission is known in which a plurality of gears is housed in a case, and a carrier is supported by the case via a bearing. A gear transmission in which a cylindrical roller bearing is disposed between a case and a carrier is disclosed in Japanese Patent Application Publication No. 2010-159774 (called Patent Document 1 below). In the cylindrical roller bearing of Patent Document 1, cylindrical rollers (rolling elements) are inclined with respect to an axis of the carrier. Since the rollers are inclined with respect to the axis of the carrier, force to move the rollers outward is applied to the rollers along with a rotation of the carrier.

SUMMARY OF INVENTION

In the technique of Patent Document 1, a retainer is provided with a function of regulating movement in an axial direction of the rollers. That is, the retainer regulates the movement of the rollers in the axial direction. Specifically, an end portion of the ring-shaped retainer on a larger diameter side makes contact with the case. The retainer holds the rollers. The movement of the retainer is regulated by the retainer making contact with the case. As a result, the movement of the rollers held by the retainer in the axial direction is regulated.

Gear transmissions include a type in which a carrier rotates as an output unit, and a type in which a case rotates as an output unit. In either gear transmission, the carrier and the case rotate relative to one another. In the description below, a gear transmission will be described of a type in which a case is stationary, and a carrier rotates as an output unit. When the carrier rotates, rollers of a cylindrical roller bearing move around an axis of the carrier while rotating. That is, the rollers roll along an inner peripheral surface of the case, and also roll along an outer peripheral surface of the carrier. In other words, the rollers roll along an inner peripheral surface of an outer race, and roll along an outer peripheral surface of an inner race. A retainer rotates with respect to the case together with the movement of the rollers.

When the retainer is brought into contact with the case, as in Patent Document 1, friction occurs between the retainer and the case. As a result, a rotation speed of the retainer relative to the case becomes slower, and a movement speed of the rollers becomes slower. Slipping of the rollers with respect to the case and the carrier occurs more readily. Sliding of the rollers with respect to the case and the carrier increases, and abrasion of the rollers occurs more readily. Thereby, deterioration of the cylindrical roller bearing may be accelerated, and durability of the gear transmission may be reduced. The present specification presents a technique to suppress deterioration of the cylindrical roller bearing disposed between the case and the carrier.

The technique taught in the present specification relates to a gear transmission having a carrier supported on a case via a bearing. The bearing comprises an inner race, an outer race, a plurality of cylindrical rollers, and a ring-shaped retainer. The inner race has a tapered outer peripheral surface, and being attached to one of the case and the carrier. The outer race has a tapered inner peripheral surface, and is attached to the other of the case and the carrier, the tapered inner peripheral surface facing the outer peripheral surface of the inner race. The plurality of cylindrical rollers is disposed between the inner race and the outer race. The ring-shaped retainer is disposed between the inner race and the outer race, and maintains spacing between adjacent rollers. A first member is fixed to the case between the case and the retainer. A second member is fixed to the carrier between the carrier and the retainer. An end part of the retainer having a larger diameter makes contact with the case via the first member, and makes contact with the carrier via the second member. Friction that occurs between the first member and the retainer is smaller than friction that occurs when the retainer makes contact with the case without using the first member. Friction that occurs between the second member and the retainer is smaller than friction that occurs when the retainer makes contact with the carrier without using the second member.

According to the aforementioned gear transmission, the retainer makes contact with both the case (first member) and the carrier (second member), thereby sliding not only with respect to the case, but also sliding with respect to the carrier. As described above, in the conventional gear transmission, the retainer is brought into contact with only the case. In the gear transmission taught in the present specification, a rotation speed of the retainer relative to the case becomes faster, compared to the conventional gear transmission, by an amount of the friction that occurs between the retainer and the carrier (second member). In other words, the gear transmission taught in the present specification can bring the rotation speed of the retainer relative to the case close to approximately half a rotation speed of the carrier relative to the case. That is, the rotation speed of the retainer relative to the case can be brought close to the rotation speed of the retainer when the retainer is making contact with neither the case nor the carrier. The sliding of the rollers with respect to the case and the carrier is suppressed, and wear in the rollers is suppressed. The deterioration of the cylindrical roller bearing is suppressed, and the durability of the gear transmission increases.

Further, according to the aforementioned gear transmission, the first member is disposed between the case and the retainer, and the second member is disposed between the carrier and the retainer. As a result, the retainer is prevented from directly making contact with the case and the carrier. The friction that may occur between the retainer and the case, and also between the retainer and the carrier can be reduced. As a result, it is possible to suppress an increase in the rotational torque for rotating the carrier.

Moreover, in the aforementioned gear transmission, the retainer does not need to constantly make contact with both the case and the carrier. While the gear transmission is stationary, the retainer may be separated from the case and the carrier. During when the gear transmission operates and force to move the rollers outward is exerted on the rollers, the retainer may make contact with both the case and the carrier (first member and second member).

DESCRIPTION OF EMBODIMENTS

Below, some of technical features of the embodiments taught in the present specification will be noted. Moreover, the features noted below each have independent technical usability.

A first member may have a ring shape and be detachable from a case. Further, the second member may have a ring shape and be detachable from the carrier. Polytetrafluoroethylene (PTFE), wholly aromatic polyimide (API), brass, sintered metal, ceramics, or the like processed into a ring shape can be used as either the first member or the second member. Alternatively, a ring-shaped steel sheet which has undergone nitriding treatment, hard chromium-plating treatment or the like, or polyvinyl chloride (PVC) which has undergone surface treatment or the like can be used as either the first member or the second member. SPCC or the like, specified in JIS G 3141, can be used as the steel sheet.

The first member may be a portion of the case having undergone a coating treatment. Further, the second member may be a portion of the case having undergone a coating treatment. PTFE, API, hard chromium, or the like, may be used as a coating material.

Cast iron such as FC specified in JIS G 5501 or FCD specified in JIS G 5502, carbon steel for machine structural use such as SC specified in JIS G 4051, alloy steel for machine structural use such as SNCM, SCM, SCr specified in JIS G 4053, aluminum, plastic, or the like can be used as materials of the case and/or the carrier.

In the gear transmission taught in the present specification, a contact area between the retainer and the first member may be equal to a contact area between the retainer and the second member. Due to this, it is possible to equalize sliding of the retainer with respect to the first member and sliding of the retainer with respect to the second member. It is possible to bring a rotation speed of the retainer relative to the case even closer to approximately half a rotation speed of the carrier relative to the case.

In the gear transmission taught in the present specification, one of a contact surface of the retainer with the first member and a contact surface of the retainer with the second member is perpendicular to an axis of the carrier, and the other of the contact surface of the retainer with the first member and the contact surface of the retainer with the second member is a cylindrical surface coaxial with the axis of the carrier. Thus, the retainer can be supported in two directions, an axial direction of the carrier and a radial direction of the carrier. It is possible to reliably prevent movement of the retainer in the axial direction of the rollers. Moreover, "contact surface intersects perpendicular to the axis of the carrier" means that the axis of the carrier forms a right angle with the contact surface.

In the gear transmission taught in the present specification, a groove may be formed in a surface (carrier contact surface) of the retainer which makes contact with the second member (carrier). Further, a groove may be formed in a surface (case contact surface) of the retainer which makes contact with the first member (case). When a groove is formed in at least one of the carrier contact surface and the case contact surface, lubricant can more easily be introduced from an exterior to an interior of the cylindrical roller bearing when the retainer is making contact with the first member and the second member. That is, a passage of the lubricant from the exterior to the interior of the cylindrical roller bearing is ensured. As a result, the lubricant can move along the groove to the interior of the cylindrical roller bearing even if the retainer is making contact with the first member and the second member. Oil film shortage of the rollers is suppressed, and the progression of wear in the roller is suppressed.

EMBODIMENTS

First Embodiment

In the embodiment, a gear transmission will be described of a type in which an external gear rotates eccentrically while meshing with an internal gear. A technique taught in the present specification can also be applied to another type of a gear transmission, e.g., a gear transmission in which an internal gear rotates eccentrically while meshing with an external gear. It should be mentioned herein that, in the following description, a retainer making contact with a case via a first member may be expressed simply as "the retainer makes contact with the case", and the retainer making contact with a carrier via a second member may be expressed simply as "the retainer makes contact with the carrier".

Figure 1:
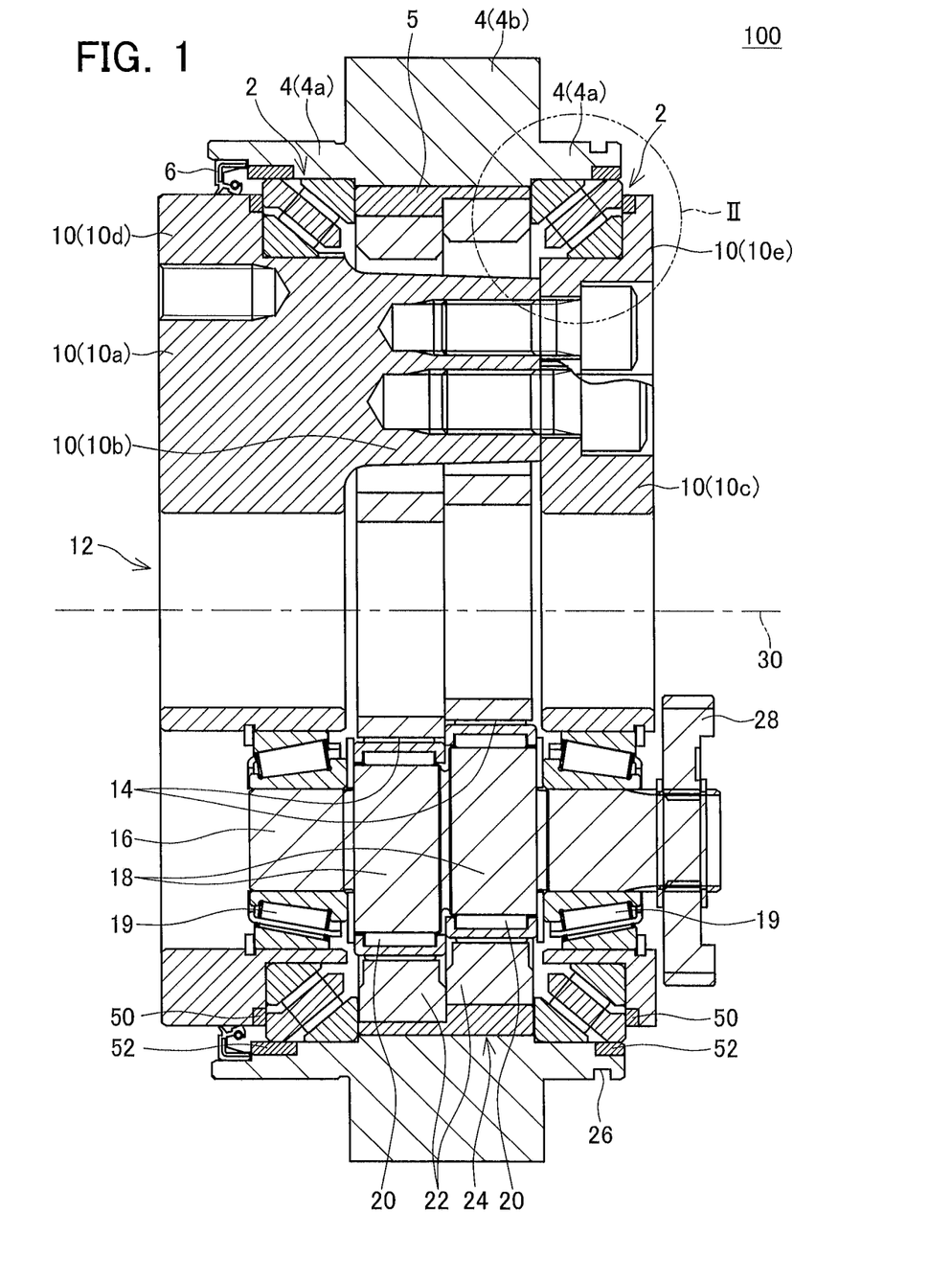
FIG. 1 shows a cross-sectional view of a gear transmission of a first embodiment.

FIG. 1 shows a cross-sectional view of a gear transmission 100. The gear transmission 100 is an eccentric oscillating type reduction gear. External gears 22 rotate eccentrically while meshing with an internal gear 24. A number of teeth of each of the external gears 22 and a number of teeth of the internal gear 24 are different. The gear transmission 100 rotates a carrier 10 by using the difference in the numbers of teeth of the external gears 22 and the number of teeth of the internal gear 24. That is, by using the difference in the numbers of teeth of the external gears 22 and the internal gear 24, the gear transmission 100 increases torque transmitted to a crankshaft 16 (reduces rotation), and outputs the torque from the carrier 10. Moreover, the carrier 10 corresponds to an output unit of the gear transmission 100. An axis 30 corresponds to a rotation axis of the carrier 10. The axis 30 also corresponds to a central axis of the internal gears 24. Further, the axis 30 also corresponds to an axis of the gear transmission 100. Further, the axis 30 also corresponds to bearing center axes of cylindrical roller bearings 2, to be described.

The gear transmission 100 comprises the internal gear 24, the carrier 10, the external gears 22, and the crankshaft 16. The internal gear 24 comprises a case 4 and a plurality of inner tooth pins 5. The case 4 includes small diameter portions 4a and a large diameter portion 4b. The small diameter portions 4a extend along the axis 30 from both ends of the large diameter portion 4b. The internal gear 24 is formed at the large diameter portion 4b of the case 4. A pair of the cylindrical roller bearings 2 is disposed at the small diameter portions 4a. A ring-shaped first member 52 is attached to a part of each small diameter portion 4a. Details of the first member 52 will be described later.

In the direction of the axis 30, the internal gear 24 is disposed between the pair of cylindrical roller bearings 2. As described above, the external gears 22 mesh with the internal gear 24. Consequently, the external gears 22 can also be said to be disposed between the pair of cylindrical roller bearings 2 in the direction of the axis 30. The pair of cylindrical roller bearings 2 regulates movements of the carrier 10 in the axial direction and radial direction. The pair of cylindrical roller bearings 2 can be called main bearings of the gear transmission 100. Details of the cylindrical roller bearings 2 will be described later.

The carrier 10 is supported by the case 4 via the pair of cylindrical roller bearings 2. The carrier 10 comprises a first plate 10a and a second plate 10c. The first plate 10a comprises a columnar portion 101). The columnar portion 10b extends from the first plate 10a toward the second plate 10c, and is fixed to the second plate 10c. A first flange 10d is formed at an end part of the first plate 10a. The first flange 10d extends in a radial direction (a direction perpendicular to the axis 30). A second flange 10e is formed at an end part of the second plate 10c. The second flange 10e extends in the radial direction. The cylindrical roller bearings 2 are disposed respectively at the first flange 10d and the second flange 10e. The first flange 10d can also be referred to as a protruding part of the first plate 10a. Further, the second flange 10e can also be referred to as a protruding part of the second plate 10c. One ring-shaped second member 50 is attached to a part of the first flange 10d, and another is attached to a part of the second flange 10e. Details of the second members 50 will be described later. Moreover, the carrier 10 and the case 4 are made of metal. Specifically, the material of the carrier 10 is FCD 450 specified in JIS G 5502, or S55C specified in JIS G 4051, and the material of the case 4 is FCD 450.

The crankshaft 16 is supported by the carrier 10 via a pair of tapered roller bearings 19. The pair of tapered roller bearings 19 regulates movements of the crankshaft 16 in the axial direction and radial direction. The crankshaft 16 extends parallel to the axis 30 at a position offset from the axis 30. The crankshaft 16 comprises an input gear 28 and eccentric bodies 18. The input gear 28 is fixed to the crankshaft 16 at an outside of the pair of tapered roller bearings 19. The eccentric bodies 18 are positioned between the pair of tapered roller bearings 19. Through holes 14 are formed in the external gears 22. The eccentric bodies 18 engage with the through holes 14 via cylindrical roller bearings 20. The external gears 22 are supported by the carrier 10 via the crankshaft 16. In the direction of the axis 30, the external gears 22 are disposed between the pair of tapered roller bearings 19.

When torque of a motor (not shown) is transmitted to the input gear 28, the crankshaft 16 rotates. The eccentric bodies 18 rotate eccentrically with the rotation of the crankshaft 16. The eccentric bodies 18 rotate eccentrically around an axis (not shown) of the crankshaft 16. With the eccentric rotation of the eccentric bodies 18, the external gears 22 rotate eccentrically while meshing with the internal gear 24. The external gears 22 rotate eccentrically around the axis 30. The number of teeth of each of the external gears 22 and the number of teeth of the internal gear 24 (the number of inner teeth pins 5) are different. Consequently, when the external gears 22 rotate eccentrically, the carrier 10 supporting the external gears 22 rotates with respect to the internal gear 24 (the case 4) in accordance with the difference in the number of teeth of the external gears 22 and the internal gear 24.

The cylindrical roller bearings 2 will be described in detail with reference to FIG. 2. Each cylindrical roller bearing 2 comprises an inner race 46, an outer race 40, rollers 42 (cylindrical rollers), and a retainer 44. The inner race 46 has a ring shape. An outer peripheral surface 46b of the inner race 46 is tapered. That is, the outer peripheral surface 46b of the inner race 46 is inclined with respect to the axis 30 (see FIG. 1). In the axis 30 direction, a diameter of the outer peripheral surface 46b is smaller on a closer side to the interior of the gear transmission 100. A rib for regulating movement of the rollers 42 is not provided on the outer peripheral surface 46b of the inner race 46. The inner race 46 is press-fitted to the outside of the second plate 10c of the carrier 10. An inner peripheral surface 46a of the inner race 46 makes contact with an outer peripheral surface of the second plate 10c. An end surface 46c of the inner race 46 in the axis 30 direction makes contact with the second flange 10e. The end surface 46c of the inner race 46 in the axis 30 direction is not in contact with the corresponding second member 50. The inner race 46 is attached to the carrier 10, and is immovable with respect to the carrier 10 in the axis 30 direction and the radial direction. It is also possible to say that the inner race 46 is integral with the carrier 10.

The outer race 40 has a ring shape. An inner peripheral surface 40b of the outer race 40 is tapered. The inner peripheral surface 40b of the outer race 40 is inclined with respect to the axis 30. In the axis 30 direction, the diameter of the inner peripheral surface 40b is greater on a closer side to the interior of the gear transmission 100. A rib that regulates movement of the rollers 42 is not provided on the inner peripheral surface 40b of the outer race 40. The inner peripheral surface 40b of the outer race 40 faces the outer peripheral surface 46b of the inner race 46. An inclination angle of the inner peripheral surface 40b with respect to the axis 30 is equal to an inclination angle of the outer peripheral surface 46b with respect to the axis 30. That is, a clearance between the inner peripheral surface 40b of the outer race 40 and the outer peripheral surface 46b of the inner race 46 (a clearance in which the rollers 42 are disposed) is constant in rotation axis directions of the rollers 42. The outer race 40 is press-fitted to an inside of each small diameter portion 4a of the case 4. An outer peripheral surface 40a of the outer race 40 makes contact with an inner peripheral surface of the case 4 (the small diameter portion 4a). The outer peripheral surface 40a of the outer race 40 is not in contact with any second member 50. An end surface 40c of the outer race 40 in the axis 30 direction makes contact with the large diameter portion 4b of the case 4. Each outer race 40 is attached to the case 4, and is immovable with respect to the case 4 in the axis 30 direction and the radial direction. It can also be said that the outer race 40 is integral with the case 4.

The rollers (cylindrical roller bearings) 42 are disposed between the inner race 46 and the outer race 40. The rotation axes of the rollers 42 are inclined with respect to the axis 30

(see FIG. 1). The plurality of rollers 42 is aligned equally spaced between the inner race 46 and the outer race 40. That is, the plurality of rollers 42 is aligned equally spaced around the axis 30. A shape of each of the rollers 42 is cylindrical. In each rotation axis direction, a length of each roller 42 is shorter than a length of the outer peripheral surface 46b of the inner race 46 and a length of the inner peripheral surface 40b of the outer race 40. An outer peripheral surface of the roller 42 makes contact with the outer peripheral surface 46b of the inner race 46 and the inner peripheral surface 40b of the outer race 40. Moreover, as described above, a rib is not provided on the outer peripheral surface 46b of the inner race 46, nor on the inner peripheral surface 40b of the outer race 40. Consequently, end surfaces 42a of each roller 42 in its rotation axis direction are not in contact with the inner race 46 and the outer race 40.

The retainer 44 is disposed between the inner race 46 and the outer race 40. A material of the retainer 44 is resin. As shown in FIG. 3, the retainer 44 is ring-shaped, and has a first end part 44a having a large diameter, and a second end part 44b having a smaller diameter than the first end part 44a. The retainer 44 has a plurality of pockets 44c aligned along a circumferential direction. The rollers 42 are inserted into the pockets 44c. The retainer 44 maintains spacings between adjacent rollers 42. Further, since the rollers 42 are inserted into the pockets 44c, both ends 42a of the rollers 42 in the rotation axis directions are constrained by the retainer 44 (see also FIG. 2). That is, movement of the rollers 42 in the axial direction relative to the retainer 44 is regulated. In other words, the retainer 44 regulates movement of the rollers 42 in the rotation axis direction. Moreover, FIG. 3 is a diagram for simply describing an overall shape of the retainer 44, and does not accurately indicate a shape of the retainer 44. The detailed shape of the retainer will be described later.

Figure 2:
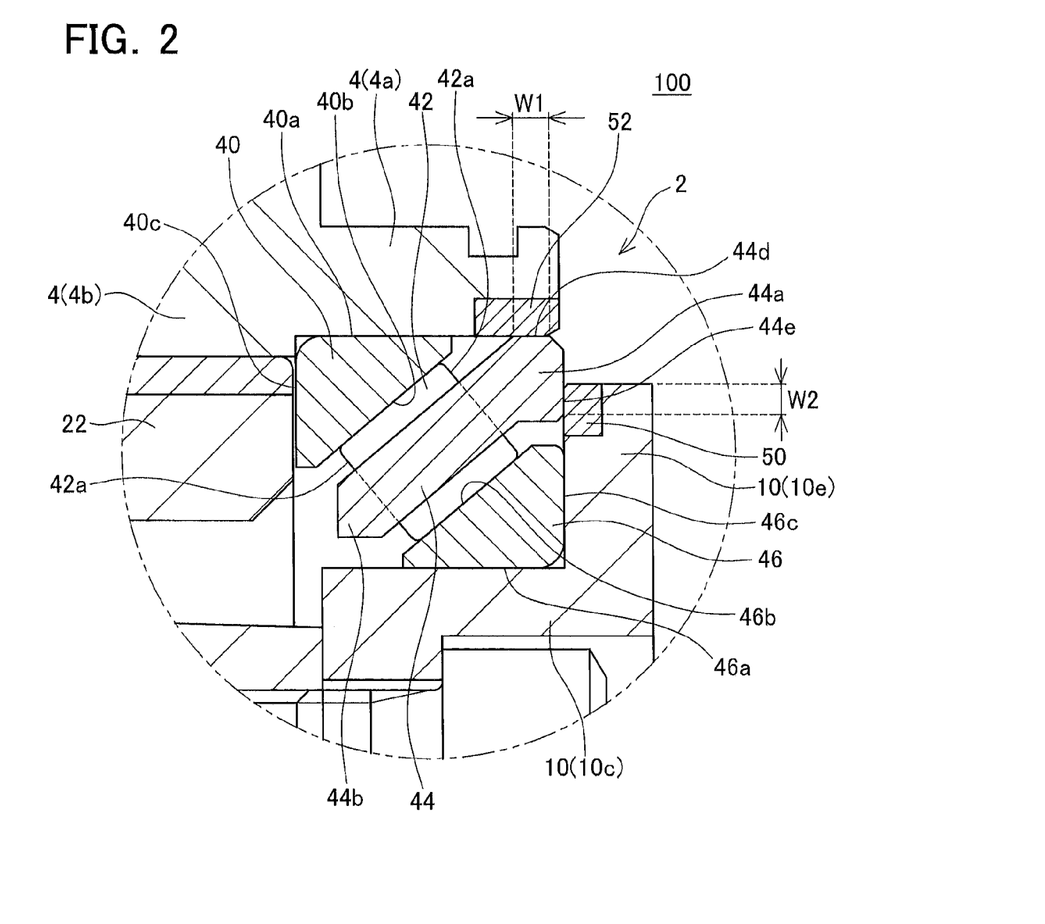
FIG. 2 shows an enlarged cross-sectional view of a range II of FIG. 1.
Figure 3:
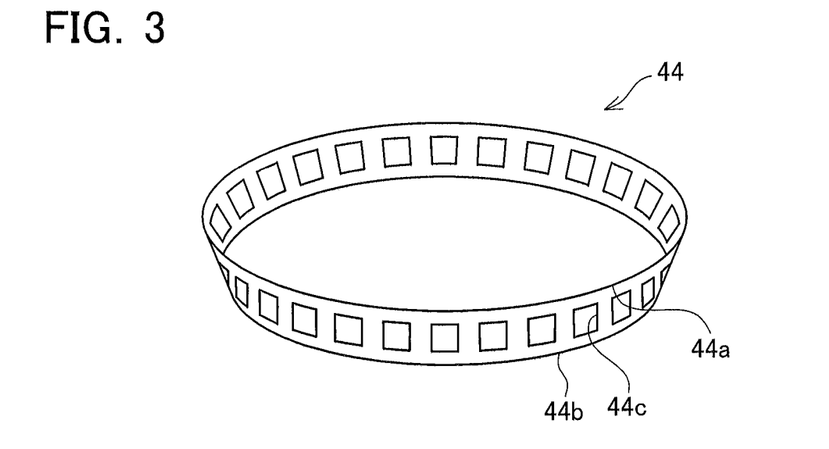
FIG. 3 shows a schematic diagram of an exterior of a retainer.

As shown in FIG. 2, a case contact surface 44d which makes contact with the case 4, and a carrier contact surface 44e which makes contact with the carrier 10, are formed in the first end part 44a of the retainer 44. The case contact surface 44d is formed in a direction perpendicular to the axis 30 (see FIG. 1). The case contact surface 44d is an outer peripheral surface of the retainer 44, and makes contact with the inner peripheral surface of the case 4 (the small diameter portion 4a) via the first member 52. Contact surfaces of the retainer 44 and the case 4 both have a cylindrical shape coaxial with the bearing center axis 30. The carrier contact surface 44e is located at an end part in the axis 30 direction. The carrier contact surface 44e is an end surface of the retainer 44 in the bearing center axis 30 direction. The carrier contact surface 44e makes contact with the second flange 10e of the carrier 10 (second plate 10c) via the second member 50. Contact surfaces of the retainer 44 and the carrier 10 are perpendicular to the axis 30.

Figure 4:
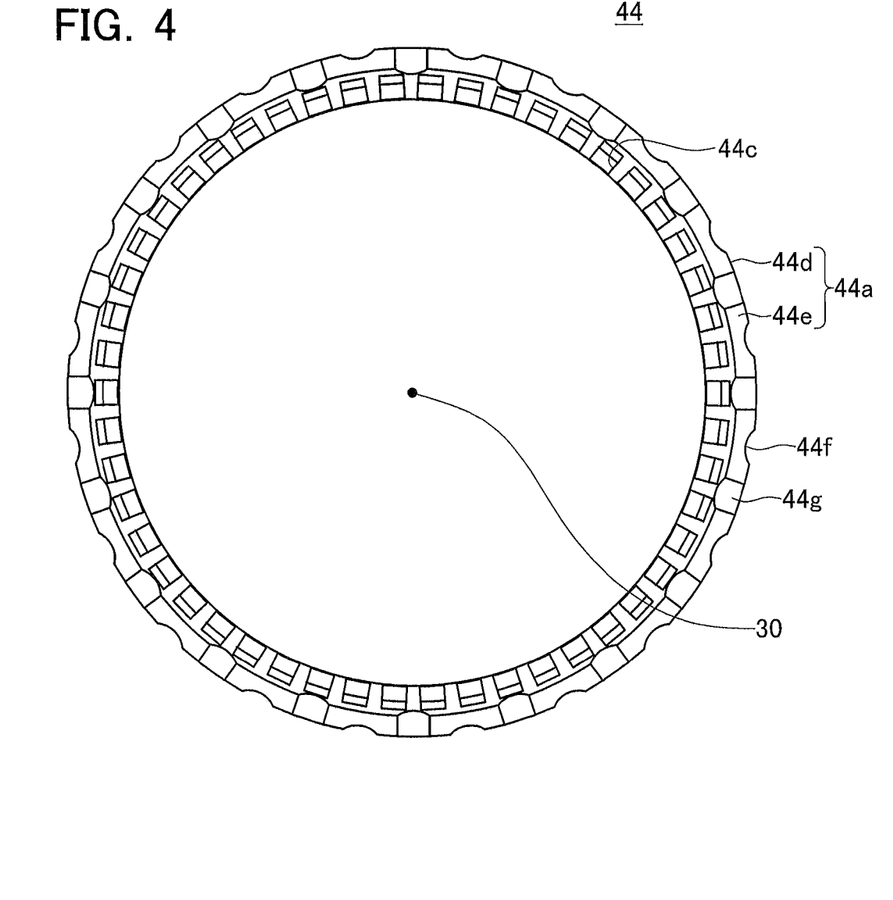
FIG. 4 shows a diagram (plan view) of the retainer seen along a direction of a bearing center axis.
Figure 5:
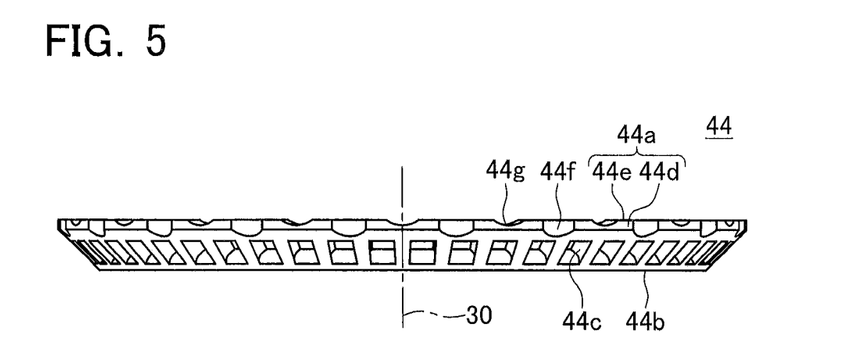
FIG. 5 shows a diagram (front view) of the retainer seen along a direction perpendicular to the bearing center axis.

The retainer 44 will be described in detail with reference to FIGS. 4, 5. The case contact surface 44d is formed on a circumference (the outer peripheral surface of the retainer 44) coaxial with the bearing center axis 30. A plurality of outer circumferential grooves 44f is formed in the case contact surface 44d. The outer circumferential grooves 44f extend along the bearing center axis 30, and are arranged equally spaced around the bearing center axis 30. The case contact surface 44d can also be expressed as being formed between adjacent outer circumferential grooves 44f. Even if the case contact surface 44d makes contact with the case 4 (the first member 52), the outer circumferential grooves 44f are not in contact with the case 4. That is, even if the case contact surface 44d makes contact with the case 4, a clearance is ensured between the retainer 44 and the case 4.

The carrier contact surface 44e is formed on a plane perpendicular to the bearing center axis 30. A plurality of end surface grooves 44g is formed in the carrier contact surface 44e. The end surface grooves 44g extend along a radial direction of the retainer 44, and are arranged equally spaced around the bearing center axis 30. The carrier contact surface 44e can also be expressed as being formed between adjacent end surface grooves 44g. The end surface grooves 44g communicate an interior and an exterior of the retainer 44. Even if the carrier contact surface 44e makes contact with the carrier 10 (the second member 50), the end surface grooves 44g are not in contact with the carrier 10. That is, even if the carrier contact surface 44e makes contact with the carrier 10, a clearance is ensured between the retainer 44 and the carrier 10.

The outer circumferential grooves 44f and the end surface grooves 44g are arranged alternately in the circumferential direction of the retainer 44. In other words, in the circumferential direction of the retainer 44, each of the outer circumferential grooves 44f is formed between adjacent end surface grooves 44g, and each of the end surface grooves 44g is formed between adjacent outer circumferential grooves 44f. A number of the outer circumferential grooves 44f and a number of the end surface grooves 44g are equal. Moreover, an area of the case contact surface 44d and an area of the carrier contact surface 44e are substantially equal. That is, an area W1 of the contact surface between the retainer 44 and the case 4 is substantially equal to an area W2 of the contact surface between the retainer 44 and the carrier 10, shown in FIG. 2.

Moreover, FIG. 2 shows a state in which the case contact surface 44d is in contact with the case 4, and the carrier contact surface 44e is in contact with the carrier 10. That is, a state is shown in which the first end part 44a of the retainer 44 is in contact with the case 4 in a direction perpendicular to the bearing center axis 30 (the radial direction of the retainer 44), and is in contact with the carrier 10 in the bearing center axis 30 direction. However, when the gear transmission 100 is not in operation, the case contact surface 44d and the carrier contact surface 44e need not make contact with the case 4 and the carrier 10. An important thing is that the case contact surface 44d and the carrier contact surface 44e are respectively in contact with the case 4 and the carrier 10 when a force to move the rollers 42 outward is applied on the rollers 42.

Figure 6:
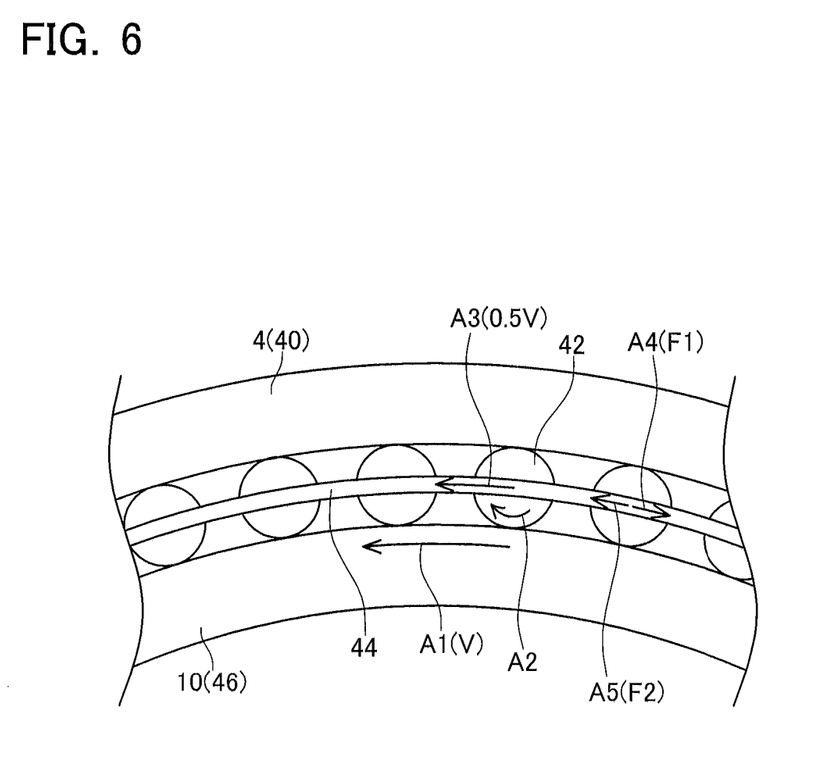
FIG. 6 shows a diagram for describing operation of rollers.

Advantages of the gear transmission 100 will be described. FIG. 6 is a diagram for describing an operation of the rollers 42 and the retainer 44 when the carrier 10 rotates relative to the case 4 which is stationary. Moreover, FIG. 6 is a diagram for describing a concept of the operation of the rollers 42 and the retainer 44, and does not accurately represent a configuration of the gear transmission 100. Further, as described above, the inner race 46 of the cylindrical roller bearings 2 can be said to be integrated with the carrier 10. Similarly, the outer race 40 can be said to be integrated with the case 4. Consequently, in FIG. 6, the inner race 46 and the carrier 10 are shown as a single component, and the outer race 40 and the case 4 are shown as a single component. Further, the rollers 42 shown in FIG. 6 represent a cross-section perpendicular to the rotation axis direction.

When the carrier 10 rotates in an arrow A1 direction, the rollers 42 move in an arrow A3 direction while rotating in an arrow A2 direction. That is, the rollers 42 move in the arrow A3 direction while rolling along an outer peripheral surface of the carrier 10 and the inner peripheral surface of the case 4. The retainer 44 rotates in the arrow A3 direction with the movement of the rollers 42. In this case, if the friction between the rollers 42 and the carrier 10, and between the rollers 42 and the case 4 is smaller, the retainer 44 rotates at a speed (rotation speed 0.5V) approximately half a rotation speed V of the carrier 10. When the friction between the rollers 42 and the carrier 10 increases, the speed of the rollers 42 approaches the speed of the carrier 10. Contrary to this, when the friction between the rollers 42 and the case 4 increases, the speed of the rollers 42 approaches the speed of the case 4 (zero).

As described above, each first end part 44a of the retainer 44 makes contact with both the case 4 and the carrier 10 (see also FIG. 2). When the retainer 44 makes contact with both the case 4 and the carrier 10, frictional force F1 in an arrow A4 direction occurs between the retainer 44 and the case 4. Further, frictional force F2 in an arrow A5 direction occurs between the retainer 44 and the carrier 10. As described above, the contact area W1 between the retainer 44 and the case 4 is approximately equal to the contact area W2 between the retainer 44 and the carrier 10. Consequently, the frictional force F1 is approximately equal to the frictional force F2. Since the frictional force F1 and the frictional force F2 cancel one another, the retainer 44 rotates in the arrow A3 direction at a speed close to the rotation speed 0.5V. The rollers 42 also move in the arrow A3 direction at the speed close to the rotation speed 0.5V.

The rollers 42 moving in the arrow A3 direction at the speed close to the rotation speed 0.5V means that the friction between the rollers 42 and the carrier 10, and the friction between the rollers 42 and the case 4 are small. In other words, the sliding of the rollers 42 relative to the carrier 10 and the case 4 is small. Consequently, the abrasion of the rollers 42 (the deterioration of the cylindrical roller bearings 2) is suppressed. Moreover, when causing the retainer to make contact with only the case, as in Patent Document 1 described above, only frictional force in the frictional force F1 direction of FIG. 6 occurs, and frictional force in the frictional force F2 direction is not obtained. Consequently, the rotation speed of the retainer becomes slower, and friction between the rollers and the carrier, and between the rollers and the case, increases. The abrasion of the rollers is accelerated, and the durability of the gear transmission is reduced. By causing the retainer 44 to make contact with both the carrier 10 and the case 4, the gear transmission 100 taught in the present embodiment can suppress the abrasion of the rollers 42 while restraining the movement of the rollers 42 in the axial direction.

As described above, the retainer 44 makes contact with the case 4 via the first member 52. That is, the retainer 44 does not make direct contact with the case 4. The first member 52 allows the friction that occurs between the first member 52 and the retainer 44 to be smaller than friction that occurs when the retainer 44 makes contact with the case 4 without using the first member 52. Further, the retainer 44 makes contact with the carrier 10 via the second member 50, and does not make direct contact with the carrier 10. The second member 50 allows the friction that occurs between the second member 50 and the retainer 44 to be smaller than friction that occurs when the retainer 44 makes contact with the carrier 10 without using via the second member 50.

The first member 52 and the second member 50 are each PTFE resin that has been processed into a ring shape, and are fitted to the case 4 and the carrier 10 respectively. In the axis 30 direction, a length of the first member 52 is greater than a length of the case contact surface 44d. The retainer 44 can be restricted from making direct contact with the case 4. The length of the first member 52 in the axis 30 direction is greater than a length in the radial direction (the direction perpendicular to the axis 30). In the radial direction, a length of the second member 50 is greater than a length of the carrier contact surface 44e. The retainer 44 can be restricted from making direct contact with the carrier 10. The length of the second member 50 in the radial direction is greater than the length in the axis 30 direction. Moreover, surface roughness of the first member 52 is smaller than surface roughness of the case 4 at a position where the first member 52 is disposed. Surface roughness of the second member 50 is smaller than surface roughness of the carrier 10 at a position where the second member 50 is disposed.

As described above, the material of the case 4 is FCD 450, and the material of the carrier 10 is FCD 450 or S55C. Friction that occurs between the retainer 44 and the first member (PTFE resin) 52 when the retainer 44 and the first member make contact is smaller than friction that occurs between the retainer 44 and the case 4 when the retainer 44 and the case 4 make contact. Further, friction that occurs between the retainer 44 and the second members (PTFE resin) 50 when the retainer 44 and the second members make contact is smaller than friction that occurs between the retainer 44 and the carrier 10 when the retainer 44 and the carrier 10 make contact. Moreover, cast iron such as FC, FCD, carbon steel for machine structural use such as SC, alloy steel for machine structural use such as SNCM, SCM, SCr, aluminum, plastic, etc. can be used as materials of the case 4 and the carrier 10. Further, PTFE, API, brass, sintered metal, ceramics, etc. that has been processed into a ring shape can be used as the first member 52 and/or the second members 50. Alternatively, the first member 52 and/or the second members 50 can also be formed by coating a part of the case 4 and/or the carrier 10 with PTFE, API, or hard chromium.

Moreover, the cylindrical roller bearing 2 disposed between the case 4 and the first plate 10a has the same characteristics as the cylindrical roller bearing 2 disposed between the case 4 and the second plate 10c (see FIG. 1). Consequently, a description of the cylindrical roller bearing 2 disposed between the case 4 and the first plate 10a will be omitted.

Other advantages of the gear transmission 100 will be described. As described above, the contact surface of the case 4 with the retainer 44 has a cylindrical shape coaxial with the axis 30. Further, the contact surface of the carrier 10 with the retainer 44 is perpendicular to the axis 30. By having such characteristics, the movement of the retainer 44 is regulated by two orthogonal directions (the axial direction and the radial direction of the gear transmission 100). The retainer 44 (the rollers 42) can reliably be prevented from disengaging from the gear transmission 100.

As described above, the retainer 44 makes contact with both the case 4 and the carrier 10. Consequently, foreign matter can be prevented, by the retainer 44, from entering into the interior of the case 4 from the exterior of the gear transmission 100. Moreover, an oil seal 6 is disposed between the case 4 and the first plate 10a, and a groove 26 is provided (see FIG. 1) is provided at a position opposed to the second plate 10c of the case 4. The groove 26 forms a loop around the outer circumference of the small diameter portion 4a. When another component (e.g., a motor) is attached to the gear transmission 100, an O-ring (not shown) is disposed in the groove 26.

Lubricant sealed within the gear transmission 100 can be prevented from leaking to outside the gear transmission 100 by the oil seal 6 and the O-ring disposed at the groove 26.

Further, the outer circumferential grooves 44f are formed in the case contact surface 44d of the retainer 44, and the end surface grooves 44g are formed in the carrier contact surface 44e of the retainer 44. Consequently, even if the retainer 44 makes contact with both the case 4 and the carrier 10, lubricant present at an exterior of the cylindrical roller bearings 2 can be introduced into an interior of the cylindrical roller bearings 2. It is possible to suppress depletion (out of oil) of the lubricant within the cylindrical roller bearings 2. More specifically, lubricant present in a vicinity of the oil seal 6 can be introduced into the interior of the cylindrical roller bearings 2 through the outer circumferential grooves 44f and the end surface grooves 44g.

When the force to move the rollers 42 outward is exerted on the rollers 42, the retainer 44 is pressed against the case 4 and the carrier 10. As described above, the retainer 44 is made of resin, and the case 4 and the carrier 10 are made of metal. That is, the retainer is made of a less rigid material than the carrier and the case. Since a rigidity of the retainer 44 is less than a rigidity of the case 4 and the carrier 10, the retainer 44 can deform when the retainer 44 is pressed against the case 4 and the carrier 10. As a result, an entirety of the retainer 44 in the circumferential direction makes uniform contact with the case 4 and the carrier 10. That is, a clearance is not easily formed between the case contact surface 44d and the case 4, or between the carrier contact surface 44e and the carrier 10.

A center through hole 12 extending along the axis 30 direction is formed at a center of the gear transmission 100. Wiring, piping or the like can be passed through the gear transmission 100 by using the center through hole 12.

Second Embodiment

Figure 7:
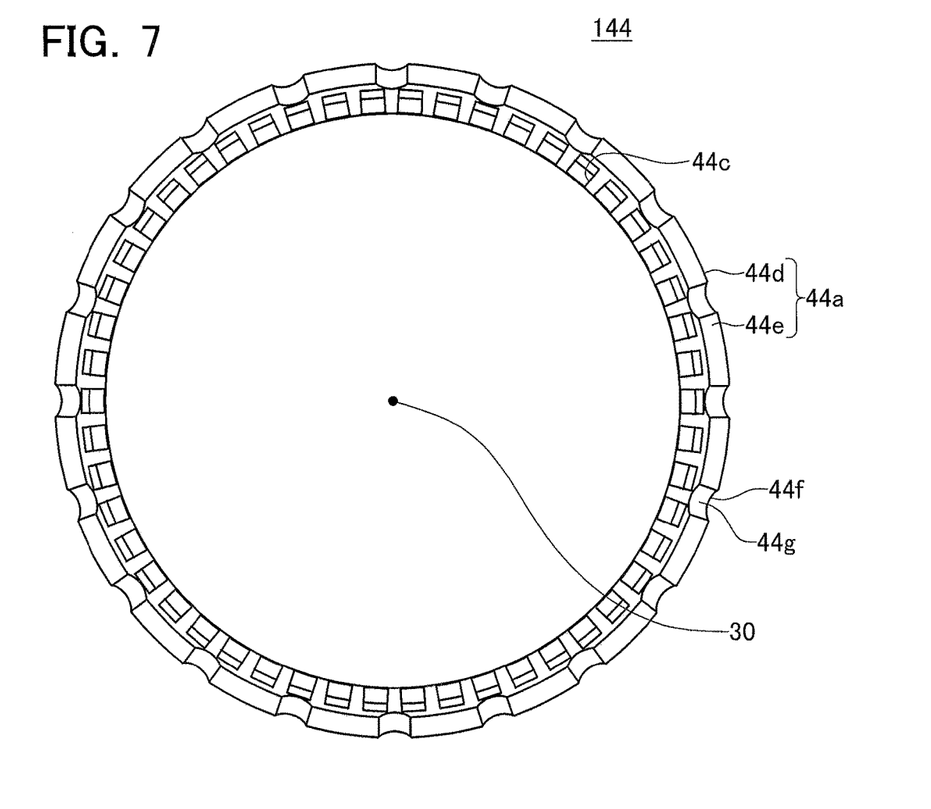
FIG. 7 shows a plan view of a retainer used in a gear transmission of a second embodiment.
Figure 8:
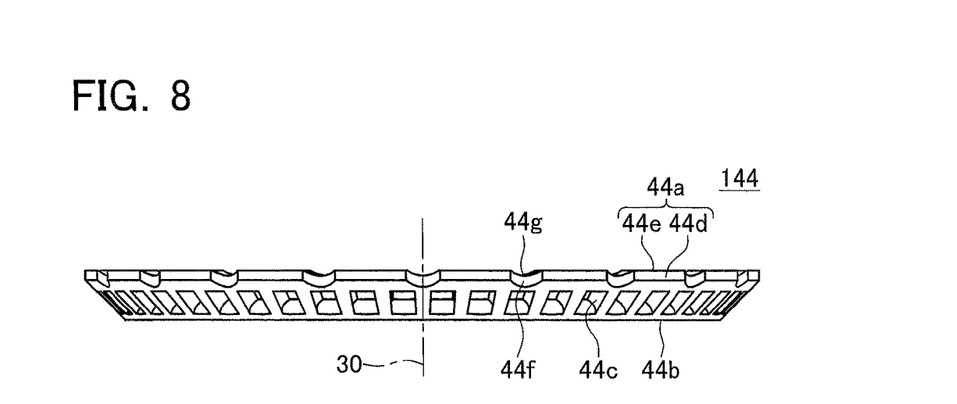
FIG. 8 shows a front view of the retainer used in the gear transmission of the second embodiment.

A gear transmission of a second embodiment will be described with reference to FIGS. 7, 8. The gear transmission of the present embodiment differs from the gear transmission 100 only in a shape of a retainer. Specifically, a retainer 144 of the present embodiment differs from the retainer 44 in a positional relationship of outer circumferential grooves formed in the case contact surface, and end surface grooves formed in the carrier contact surface. Common features of the retainer 144 and the retainer 44 will be denoted by the same reference numbers or by reference numbers having the same lower two digits, and a description thereof may be thereby omitted.

Outer circumferential grooves 44f and end surface grooves 44g are formed at same positions in a circumferential direction of the retainer 144. Consequently, the outer circumferential grooves 44f and the end surface grooves 44g are contiguous. Lubricant present at the exterior of the cylindrical roller bearings 2 is introduced to the interior of the cylindrical roller bearings 2 through the outer circumferential grooves 44f and the end surface grooves 44g. By using the retainer 144, the lubricant can be more readily introduced to the interior of the cylindrical roller bearings 2.

Third Embodiment

A gear transmission of a third embodiment will be described with reference to FIGS. 9, 10. The gear transmission of the present embodiment differs from the gear transmission 100 only in a shape of a retainer. Specifically, a retainer 244 of the present embodiment differs from the retainer 44 in a shape of outer circumferential grooves formed in the case contact surface, and a shape of end surface grooves formed in the carrier contact surface. Common features of the retainer 244 and the retainer 44 will be denoted by the same reference numbers or by reference numbers having the same lower two digits, and a description thereof may be thereby omitted.

Figure 9:
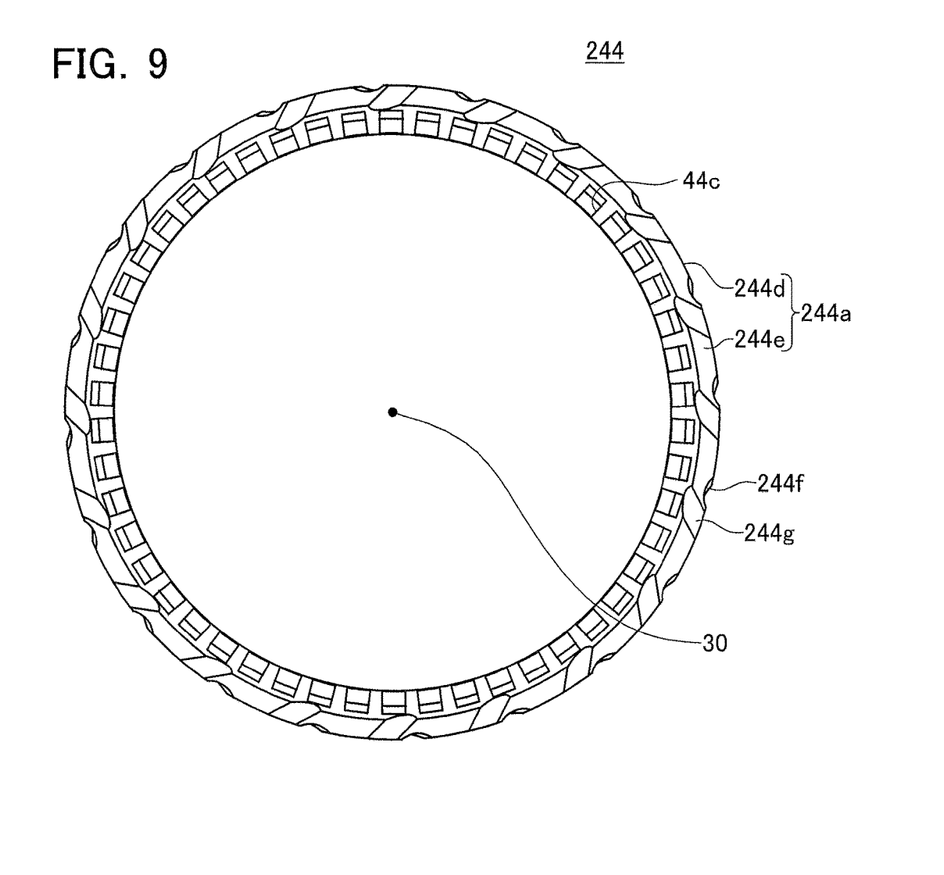
FIG. 9 shows a plan view of a retainer used in a gear transmission of a third embodiment.
Figure 10:
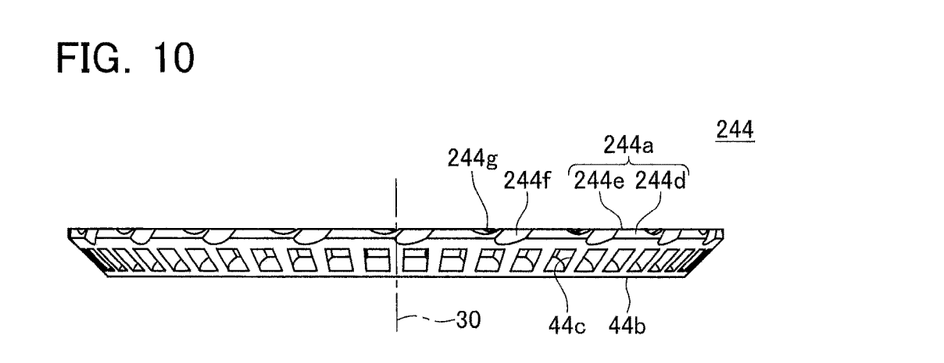
FIG. 10 shows a front view of the retainer used in the gear transmission of the third embodiment.

As shown in FIG. 9, a plurality of end surface grooves 244g is formed in a carrier contact surface 244e. When the end surface grooves 244g are viewed along the bearing center axis 30 direction, a direction along which the end surface grooves 244g extend is inclined with respect to a straight line joining an outer peripheral surface (a case contact surface 244d) of the retainer 244 and the bearing center axis 30 (compare to FIG. 4 for reference). Each of the plurality of end surface grooves 244g is inclined in a same direction. Further, as shown in FIG. 10, a plurality of outer circumferential grooves 244f is formed in a case contact surface 244d. When the outer circumferential grooves 244f are viewed along the direction perpendicular to the bearing center axis 30, a direction along which the outer circumferential grooves 244f extend is inclined with respect to the bearing center axis 30 (compare to FIG. 5 for reference). Each of the plurality of outer circumferential grooves 244f is inclined in a same direction. Moreover, the end surface grooves 244g and the outer circumferential grooves 244f are arranged alternately in the circumferential direction of the retainer 44. That is, each of the end surface grooves 244g are formed between adjacent outer circumferential grooves 244f, and each of the outer circumferential grooves 244f are formed between adjacent end surface grooves 244g.

When the gear transmission is in operation, the retainer 244 rotates with respect to the carrier 10 and the case 4. When the end surface grooves 244g are inclined, lubricant can move smoothly in the end surface grooves 244g together with a rotation of the retainer 244. Similarly, when the outer circumferential grooves 244f are inclined, the lubricant can move smoothly in the outer circumferential grooves 244f together with the rotation of the retainer 244. Moreover, as with the retainer 144, the end surface grooves 244g and the outer circumferential grooves 244f may be contiguous.

Fourth Embodiment

Figure 11:
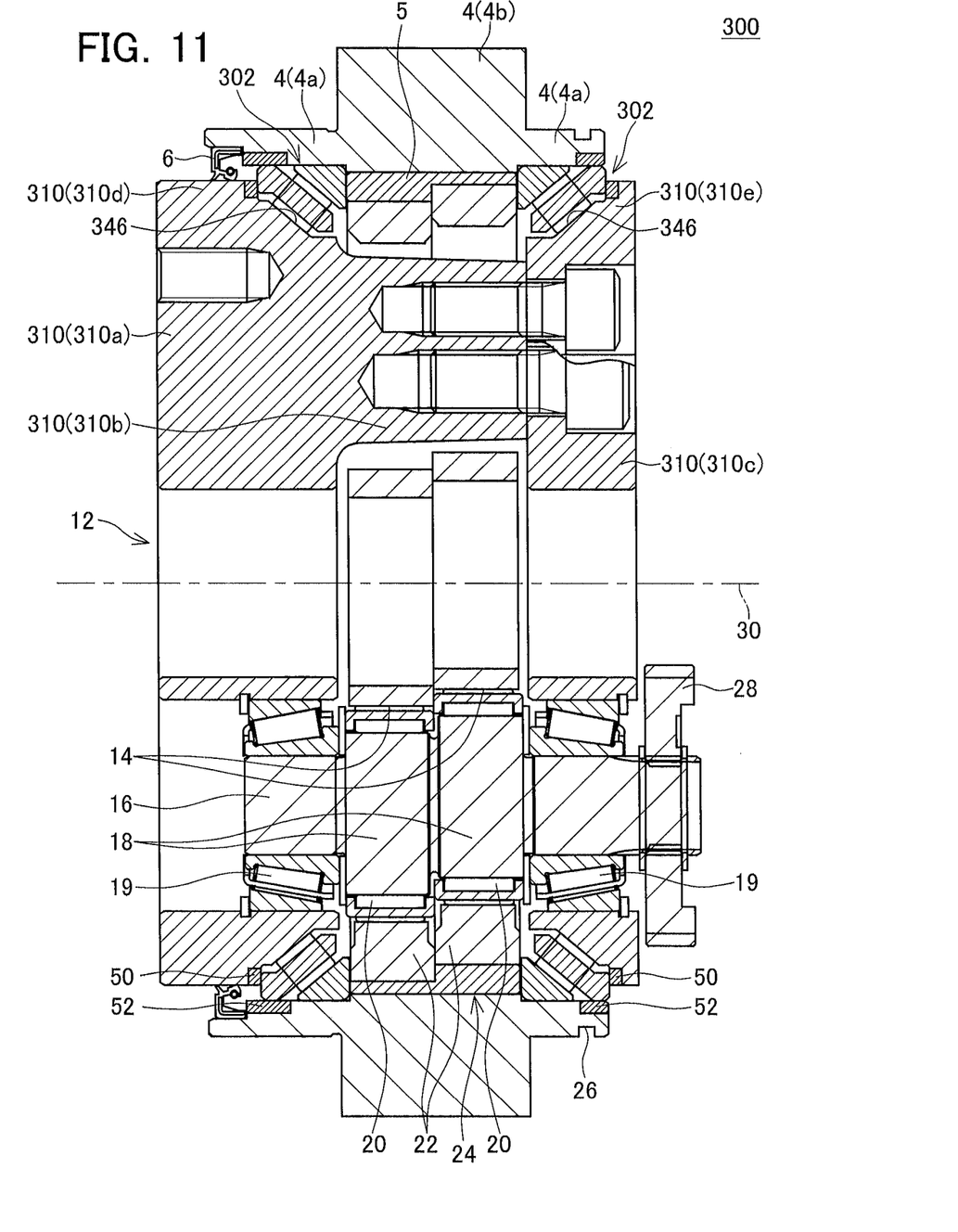
FIG. 11 shows a cross-sectional view of a gear transmission of a fourth embodiment.

A gear transmission 300 will be described with reference to FIG. 11. The gear transmission 300 is a modification of the gear transmission 100, and components which are same as those of the gear transmission 100 will be denoted by the same reference numbers or by reference numbers having the same lower two digits, and a description thereof may be thereby omitted.

In the gear transmission 300, an inclined portion 346 is provided each at a radial direction end part of a first plate 310a and a radial direction end part of a second plate 310c. The inclined portions 346 also function as inner races of cylindrical roller bearings 302. That is, each inner race of the cylindrical roller bearings 302 is integrated with a carrier 310. In such a configuration, it can also be said that the inner races are attached to the carrier 310. A flange 310d is formed outside the inclined portion 346 of the first plate 310a in the axis 30 direction. A flange 310e is formed outside the inclined portion 346 of the second plate 310c in the axis 30 direction. A retainer 44 herein is the same as the retainer 44 used in the gear transmission 100. Consequently, the retainers 44 make contact with respectively the flange 310d and the flange 310e.

In the embodiments described above, a gear transmission was described which uses a retainer having a groove formed in both a carrier contact surface and a case contact surface. However, the technique disclosed in the present specification can also be applied to a gear transmission which uses a retainer having a groove formed in one of the carrier contact surface and the case contact surface, and to a gear transmission which uses a retainer not having a groove formed in either of the carrier contact surface or the case contact surface.

In the embodiments described above, an example was described in which the contact area between the case and the retainer, and the contact area between the carrier and the retainer are equal. However, e.g., the contact area between the case and the retainer may be larger than the contact area between the carrier and the retainer. Contrary to this, the contact area between the carrier and the retainer may be larger than the contact area between the case and the retainer. Even in such forms, the friction of the rollers can be made smaller than in the conventional gear transmission in which the retainer makes contact with only the case. If the retainer makes contact with both the case and the carrier, the abrasion of the rollers can be suppressed more than in the conventional gear transmission.

In the embodiments described above, an example was described in which the outer race is attached to the case, and the inner race is attached to the carrier. Alternatively, the inner race may be attached to the case, and the outer race may be attached to the carrier.

In the embodiments described above, an example was described in which the case is stationary, and the carrier rotates with respect to the case. The technique taught in the present specification may also be applied to a gear transmission in which the carrier is stationary, and the case rotates with respect to the carrier. Further, the technique taught in the present specification may also be applied to a gear transmission in which the crankshaft is disposed coaxially with the axis of the carrier. Further, the technique taught in the present specification may also be applied to a gear transmission which is different from an eccentric oscillating type.

In the fourth embodiment, an example was described in which the carrier also functions as the inner race. The case may also function as the outer race. Further, the carrier may also function as the inner race, and the case may also function as the outer race. What is important is that the cylindrical roller bearings are provided between the case and the carrier, that the rotation axis of each of the rollers of the cylindrical roller bearings is inclined with respect to the axis of the carrier, and that the retainer holding the rollers makes contact with both the case and the carrier.

Specific examples of the present invention have been described in detail, however, these are mere exemplary indications and thus do not limit the scope of the claims. The art described in the claims includes modifications and variations of the specific examples presented above. Technical features described in the description and the drawings may technically be useful alone or in various combinations, and are not limited to the combinations as originally claimed. Further, the art described in the description and the drawings may concurrently achieve a plurality of aims, and technical significance thereof resides in achieving any one of such aims.

The invention claimed is:

1. A gear transmission having a carrier supported on a case via a bearing, wherein the bearing comprises:
    an inner race having a tapered outer peripheral surface, and being attached to one of the case and the carrier;
    an outer race having a tapered inner peripheral surface, and being attached to the other of the case and the carrier, the tapered inner peripheral surface facing the outer peripheral surface of the inner race;
    a plurality of cylindrical rollers disposed between the inner race and the outer race; and
    a ring-shaped retainer disposed between the inner race and the outer race, and maintaining spacing between adjacent rollers,
    wherein a first member is fixed to the case between the case and the retainer,
    a second member is fixed to the carrier between the carrier and the retainer,
    an end part of the retainer having a larger diameter makes contact with the case via the first member, and makes contact with the carrier via the second member,
    friction that occurs between the first member and the retainer is smaller than friction that occurs when the retainer makes contact with the case without using the first member, and
    friction that occurs between the second member and the retainer is smaller than friction that occurs when the retainer makes contact with the carrier without using the second member.

2. The gear transmission according to claim 1, wherein the first member has a ring shape and the first member is releasably fixed and detachable from the case.

3. The gear transmission according to claim 2, wherein the second member has a ring shape and the second member is releasably fixed and detachable from the carrier.

4. The gear transmission according to claim 3, wherein a contact area between the first member and the retainer and a contact area between the second member and the retainer are equal.

5. The gear transmission according to claim 4, wherein one of a contact surface of the retainer with the first member and a contact surface of the retainer with the second member is perpendicular to an axis of the carrier, and the other of the contact surface of the retainer with the first member and the contact surface of the retainer with the second member is a cylindrical surface coaxial with the axis of the carrier.

6. The gear transmission according to claim 5, wherein a groove is provided in at least one of a contact surface of the retainer with the first member and a contact surface of the retainer with the second member.

7. The gear transmission according to claim 6, wherein the groove comprises a plurality thereof, the plurality of the grooves comprises first grooves, and the first grooves are provided in the contact surface of the retainer with the first member, and the first grooves are disposed equally spaced from each other.

8. The gear transmission according to claim 7, wherein the plurality of the grooves further comprises second grooves, and the second grooves are provided in the contact surface of the retainer with the second member, and the second grooves are disposed equally spaced from each other.

9. The gear transmission according to claim 1, wherein the second member has a ring shape and the second member is releasably fixed and detachable from the carrier.

10. The gear transmission according to claim 1, wherein a contact area between the first member and the retainer and a contact area between the second member and the retainer are equal.

11. The gear transmission according to claim 1, wherein one of a contact surface of the retainer with the first member and a contact surface of the retainer with the second member is perpendicular to an axis of the carrier, and the other of the contact surface of the retainer with the first member and the contact surface of the retainer with the second member is a cylindrical surface coaxial with the axis of the carrier.

12. The gear transmission according to claim 1, wherein a groove is provided in at least one of a contact surface of the retainer with the first member and a contact surface of the retainer with the second member.

13. The gear transmission according to claim 12, wherein the groove comprises a plurality thereof, the plurality of the grooves comprises first grooves, and the first grooves are provided in the contact surface of the retainer with the first member, and the first grooves are disposed equally spaced from each other.

14. The gear transmission according to claim 12, wherein the groove comprises a plurality thereof, the plurality of the grooves comprises second grooves, and the second grooves are provided in the contact surface of the retainer with the second member, and the second grooves are disposed equally spaced from each other.

15. The gear transmission according to claim 13, wherein the plurality of the grooves further comprises second grooves, and the second grooves are provided in the contact surface of the retainer with the second member, and the second grooves are disposed equally spaced from each other.

* * * * *